May 22, 1928. 1,670,308
W. L. MARDEN
IRRIGATION METER
Filed June 18, 1927
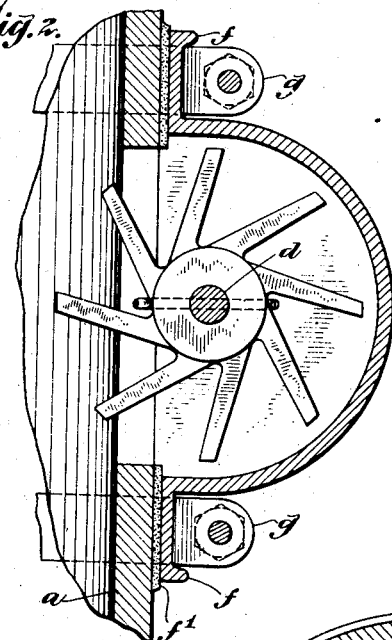
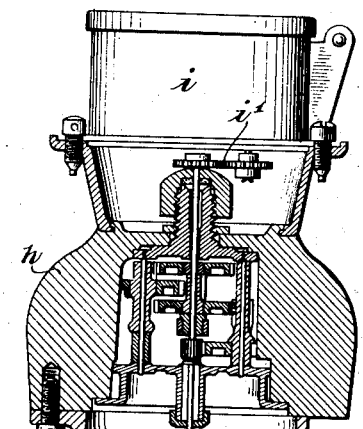
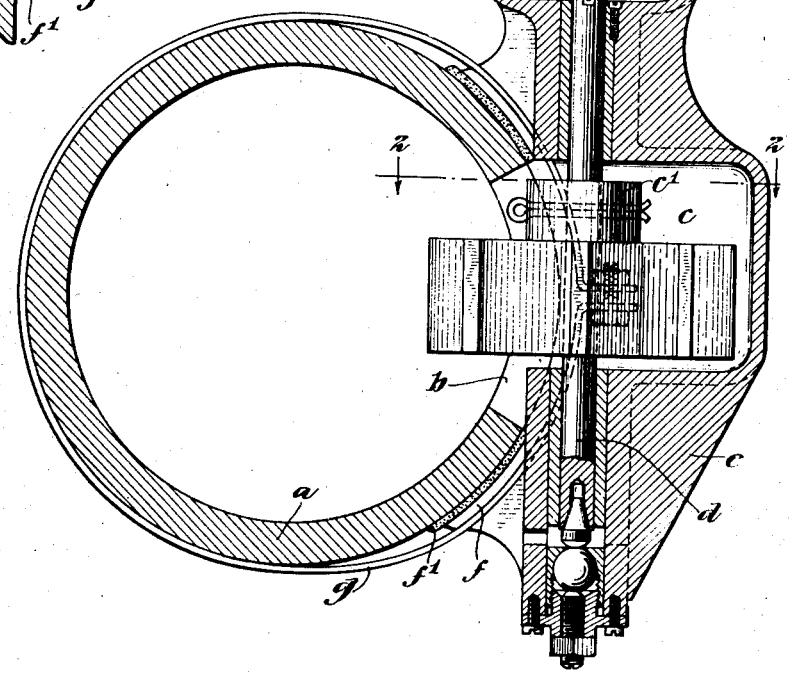
Inventor
William L. Marden
By his Attorneys
Redding, Greeley, O'Shea & Campbell Patented May 22, 1928.

1,670,308

UNITED STATES PATENT OFFICE.

WILLIAM L. MARDEN, OF NEW YORK, N. Y., ASSIGNOR TO NEPTUNE METER COMPANY, OF NEW YORK, N. Y., A CORPORATION OF NEW JERSEY.

IRRIGATION METER.

Application filed June 18, 1927. Serial No. 199,681.

For irrigation purposes, water is commonly conducted through open ditches and therefore carries with it more or less solid material which would interfere with or prevent the operation of the ordinary metering devices which are sometimes placed in tubes, through which the flow is directed, at points where it is desired to meter the flow. This difficulty has prevented the use for this purpose of meters which approach accuracy in their indication and has left the measurement of the flow under such conditions to be largely a matter of estimate or even guess work. It is therefore the object of the present invention to provide metering devices which shall be adapted for the particular use referred to, shall give a fair indication of the rate of flow at any time and the volume of flow in a given period of elapsed time, and shall not be liable to have their operation prevented or interfered with by solid matter carried with the water.

In accordance with the invention, the tube (which may be long or short) through which the entire flow is directed, filling the tube, has formed in its wall an orifice, through which project into the current the lowermost paddles of a paddle wheel, which is mounted with its axis outside of the tube. Associated with the paddle wheel in the usual manner are a reduction gearing and a register of the usual or suitable construction. These working parts are mounted in or supported by a saddle, which may either be an integral part of the tube, as in new construction, or may be clamped upon the tube, as when the metering devices are applied to the tube in place.

The invention will be more fully explained hereinafter with reference to the accompanying drawing, in which:

Figure 1 is a view in transverse sectional elevation, showing a tube with the improved metering devices supported in operative relation therewith by a saddle clamped upon the tube.

Figure 2 is a detail view in horizontal section on the plane indicated by the broken line 2—2 of Figure 1.

The tube $a$, through which is directed the entire flow of water to be metered, is shown as having in its wall an orifice $b$ to permit the projection into the current within the tube but not to the opposite side of the blades of a paddle wheel $c$, the hub $c'$ of which is mounted on a shaft $d$. The latter is mounted in suitable bearings in a frame piece $e$, which is formed as a part of or is supported by a saddle $f$. The latter is fitted closely upon the outside of the tube, with an interposed packing $f'$, if necessary, and is securely held to the tube by clamps $g$.

To one end of the frame piece $e$ is secured a casing $h$ which supports the usual reduction gearing $h'$, and upon the casing $h$ is supported the usual register, indicated sufficiently at $i$ and driven from the gearing $h'$ through gears $i'$ as usual.

It will be obvious that as the paddles of the paddle wheel $c$ project into the flowing water in the tube though not to the opposite side of the tube, the meter gearing and register will be actuated thereby in accordance with the flow and the flow will therefore be metered with sufficient accuracy. It will also be observed that as the paddles only of the paddle wheel project into the flow only at their extremities, to one side of the axis of rotation, its rotation cannot be interfered with seriously by any solid matter carried along with the water, the exposed portions of the blades of the paddle wheel yielding to the impact of solid matter even as they yield to the flow of water.

It will be understood that various changes can be made in details of construction and arrangement to suit different conditions of use or the application of the device in the field, to a section of tubing in place, or in the shop to a section of tubing specially prepared for introduction into the line.

I claim as my invention:

1. In an irrigation meter, the combination of a tube through which the flow of water is directed and having an aperture in its wall, a supporting frame secured upon the tube and covering the aperture, a shaft mounted in the frame outside of the tube, a paddle wheel mounted on the shaft and having its blades projected into the tube through the aperture but not to the opposite side of the tube, and a register in operative relation with the shaft.

2. In an irrigation meter, the combination of a tube through which the flow of water is directed and having an aperture in its wall, a saddle and frame piece, means to clamp said saddle and frame piece upon the tube and covering the aperture, a shaft mounted in the saddle and frame piece outside of the tube, a paddle wheel mounted on the shaft and having its blades projected into the tube through the aperture, and a register in operative relation with the shaft.

This specification signed this 13th day of June, A. D. 1927.

WILLIAM L. MARDEN.